United States Patent [19]

Ebenhoch

[11] Patent Number: 4,648,759
[45] Date of Patent: Mar. 10, 1987

[54] AUTOMATIC COOLANT INDUCER ARRANGEMENT

[75] Inventor: Sebastian Ebenhoch, Waukesha, Wis.

[73] Assignee: Waukesha Cutting Tools, Inc., Waukesha, Wis.

[21] Appl. No.: 770,387

[22] Filed: Aug. 28, 1985

[51] Int. Cl.$^4$ .................... B23B 27/10; B23B 51/06
[52] U.S. Cl. .................................. 408/59; 409/136; 409/232
[58] Field of Search .............. 408/56, 57, 58, 59, 408/60; 409/135, 136, 232, 234; 285/325, 331

[56] References Cited

U.S. PATENT DOCUMENTS

| | | | |
|---|---|---|---|
| 2,279,733 | 4/1942 | Cross | 285/325 |
| 2,933,334 | 4/1960 | De Moude | 285/325 |
| 3,874,808 | 4/1975 | Zaccardelli et al. | 408/56 |
| 4,392,761 | 7/1983 | Eckle | 409/136 |
| 4,557,643 | 12/1985 | Cioci | 409/136 |
| 4,563,116 | 1/1986 | Edens | 409/136 |

FOREIGN PATENT DOCUMENTS 0015248  9/1980  European Pat. Off. ............ 409/135

Primary Examiner—John Sipos
Assistant Examiner—Donald R. Studebaker
Attorney, Agent, or Firm—Andrus, Sceales, Starke & Sawall

[57] ABSTRACT

A coolant inducer pipe has one end thereof communicating with a source of coolant and is fixedly supported to place the opposite open end thereof adjacent to and beneath a machine tool spindle. The coolant inducer pipe is engageable with a coolant inducer ring on a metal cutting tool simultaneously with engagement of the cutting tool shank within the machine tool spindle.

3 Claims, 5 Drawing Figures

AUTOMATIC COOLANT INDUCER ARRANGEMENT

BACKGROUND OF THE INVENTION

This invention relates to an automatic coolant inducer arrangement for rotary metal cutting tools as employed in machine tools such as machining centers.

In automatic machine tools the coolant is generally copiously supplied apart from the cutting tool to the work area. If supplied through the cutting tool as by use of a coolant inducer ring, the coolant supply will generally be more efficient, and at least in the case of a drilling operation, will provide for an efficient evacuation of the cutting chips from the work hole. It is generally an object of this invention to provide an automatic coolant inducer arrangement.

SUMMARY OF THE INVENTION

Generally the invention contemplates a machine tool having a head and a spindle drivingly supported by the head. A cutting tool comprising a generally cylindrical body has a shank at one end thereof engageable within the machine tool spindle. A coolant inducer ring having an inlet is secured axially on the shank of the cutting tool in spaced relation from the spindle engaging portion. The cutting tool body has flutes that open to the leading end of the tool and cutting edges are associated with the flutes. The cutting tool body further has internal coolant passages that communicate with the coolant inducer ring and have discharge openings adjacent to the cutting edges. A coolant inducer pipe has one end thereof communicating with a source of coolant. The coolant inducer pipe is supported to place the open end thereof in fixed relation adjacent to and beneath the machine tool spindle. The coolant inducer ring is engageable with the coolant inducer pipe to place the inlet in aligned relation with the open end of the inducer pipe simultaneously with engagement of the cutting tool shank within the machine tool spindle to provide for coolant flow through and from the cutting tool to cool the cutting tool and workpiece in service.

DESCRIPTION OF THE DRAWING FIGURES

The drawings furnished herewith illustrate the best mode presently contemplated for the invention and are described hereinafter.

In the drawings:

FIG. 1 schematically shows an automatic machine tool which includes the present invention;

DESCRIPTION OF THE ILLUSTRATED EMBODIMENT

Figure 2:
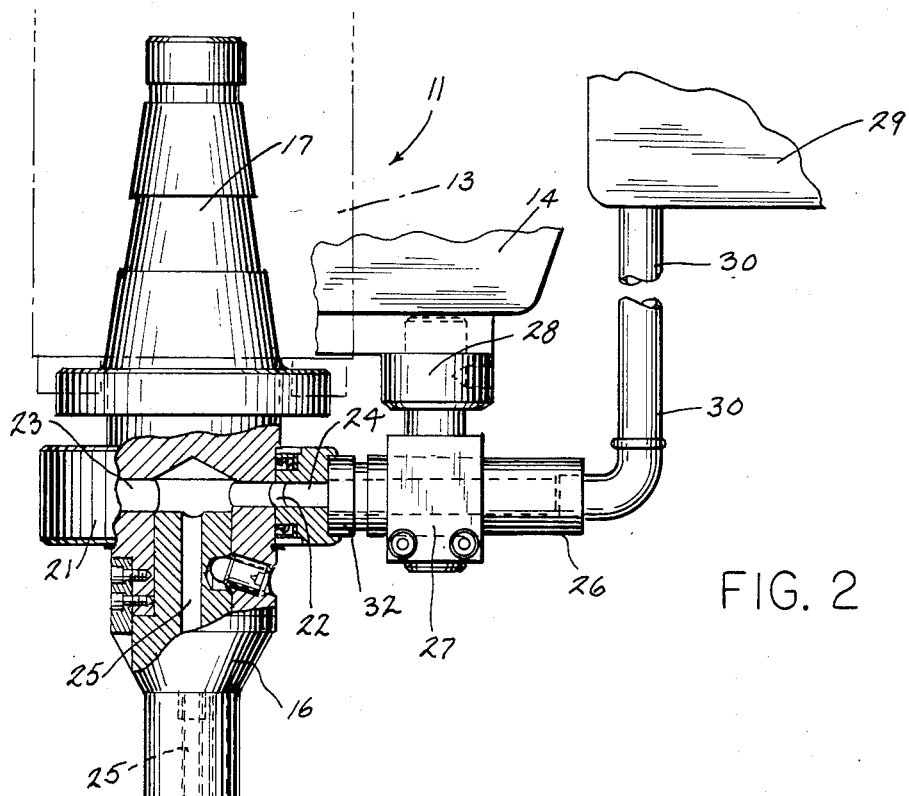
FIG. 2 is an elevational view partially in section and shows the coolant supply arrangement of this invention for a metal cutting tool as rotatably supported within the spindle of a machine tool like that shown in FIG. 1.
Figure 1:
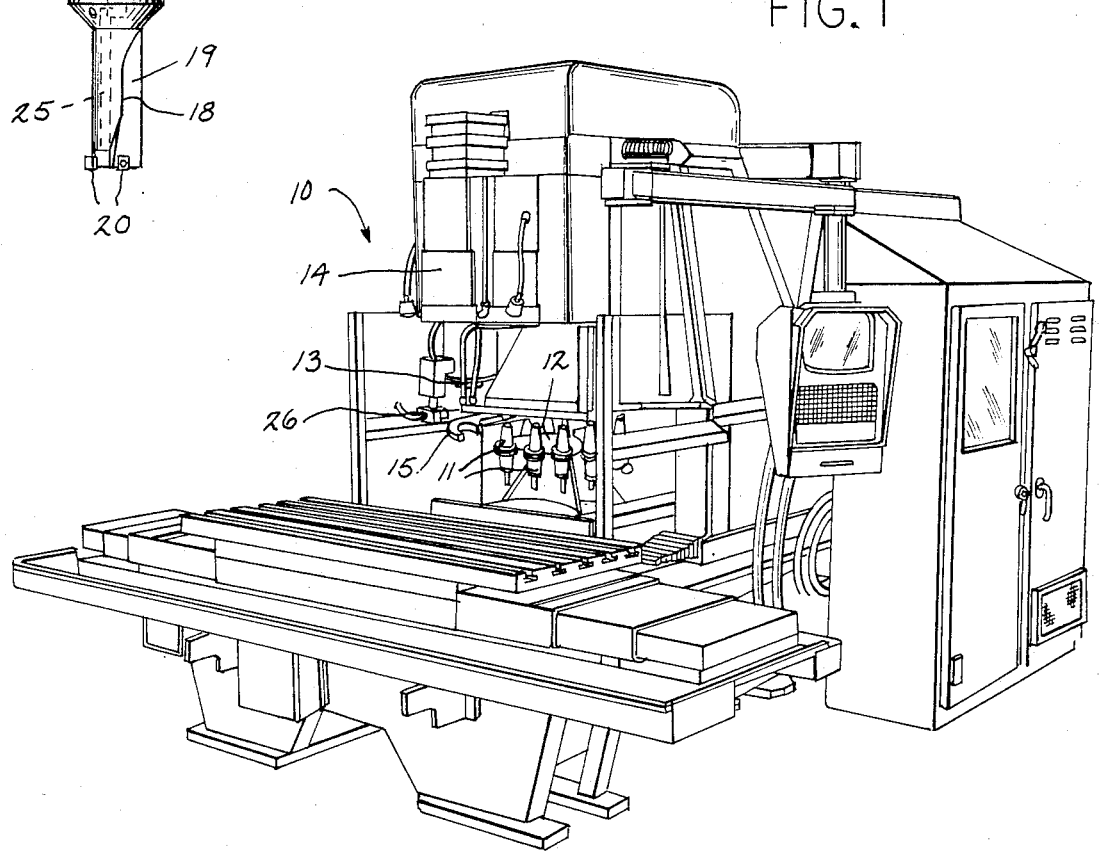

Referring to the drawings, the machine tool 10 is adapted to automatically modify a metal workpiece, not shown, with a plurality of rotatable cutting tools 11 as carried in the tool storage or magazine 12. The cutting tools 11 are selected according to a control program and mounted for a cutting operation in the rotatable spindle 13, shown in dot-dash lines in FIG. 2, of the machine head 14 by a suitable arm 15. The arm 15 is adapted to pick up a selected tool 11 in the magazine 12 and place that tool in the spindle 13, and thereafter following a cutting operation, to retrieve the tool from the spindle for return to the storage magazine.

Each cutting tool 11 in the magazine 12 comprises a generally cylindrical body 16 having an axially extending shank 17 at one end thereof for engaging within the spindle 13 of the machine tool 10. Oppositely from the shank 17, the body 16 further includes a pair of diametrically opposed flutes 18 that open to the leading end of the tool 11. The generally flat back wall 19 of the flutes is provided with suitable pockets for carrying appropriate cutting inserts 20 for boring, reaming, facing, etc. as desired.

The shank 17 of each cutting tool 11 also carries a coolant inducer ring 21 on the lower end thereof. The inducer ring 21 includes an annular recess 22 that opens inwardly to communicate with one or more radially extending passages 23 in the body 16 to provide for coolant flow to the body even while the cutting tool 11 rotates relative to the inducer ring. Recess 22 receives coolant from the tubular inlet passage 24 which extends radially and opens from the inducer ring 21. The passages 23 in the body 16 communicate with one or more axially extending passages 25 in the body 16 whereby the coolant is directed to or toward the leading end of the tool 11 for discharge generally adjacent to the cutting inserts 20 to cool the tool and corresponding portion of the workpiece and to evacuate the cutting chips in service.

Ordinarily a coolant inducer ring 21 is manually connected to a source of coolant. According to the present invention, however, the connection is made automatically.

According to the invention, a coolant induction pipe 26 is secured within a clamp 27 supported by the bracket 28 from the head 14 of the machine 10. At one end the pipe 26 is connected to a source or reservoir 29 of coolant by the intervening pipe 30.

Figure 5:
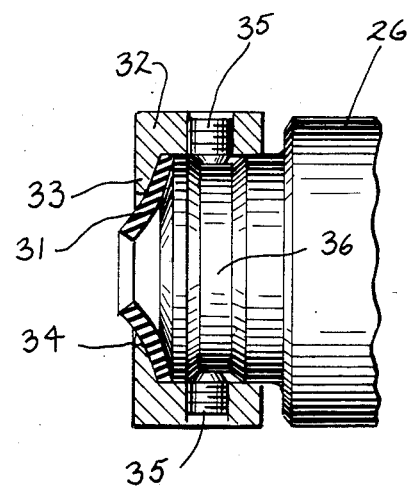
FIG. 5 is a detail view partially in section and shows the open end of the coolant inducer pipe when disengaged from the coolant inducer ring.

The opposite open or remote end of pipe 26 is beveled such that the inner bore edge of the pipe projects longitudinally beyond the outer peripheral edge. A sealing washer 31 of rubber or rubber-like material is disposed against the beveled end of the pipe 26 and an end cap 32 slides over the end of the pipe to secure the washer. The cap member 32 terminates with an inwardly projecting annular flange 33 that provides for an end opening 34 in the cap member. The rear side of the flange 33 is formed with a taper which generally parallels the bevel on the end of pipe 26. When the end cap 32 is secured by a plurality of set screws 35 that engage within the outer peripheral recess 36 of pipe 26, the washer 31 is tightly clamped between the beveled end of the pipe and the annular flange 33 and is thereby made to assume a generally conical configuration and to project forwardly out through the opening 34 of the cap member as generally shown in FIG. 5.

As supported from the machine tool head 14 by the bracket 28, the coolant induction pipe 26 is secured generally rigidly and in fixed position adjacent to and beneath the spindle 13. So located, the end of the induction pipe 26 is operatively engaged by the inducer ring 21 when the selected cutting tool 11 is engaged within the spindle 13 by the machine tool arm 15.

Figure 3:
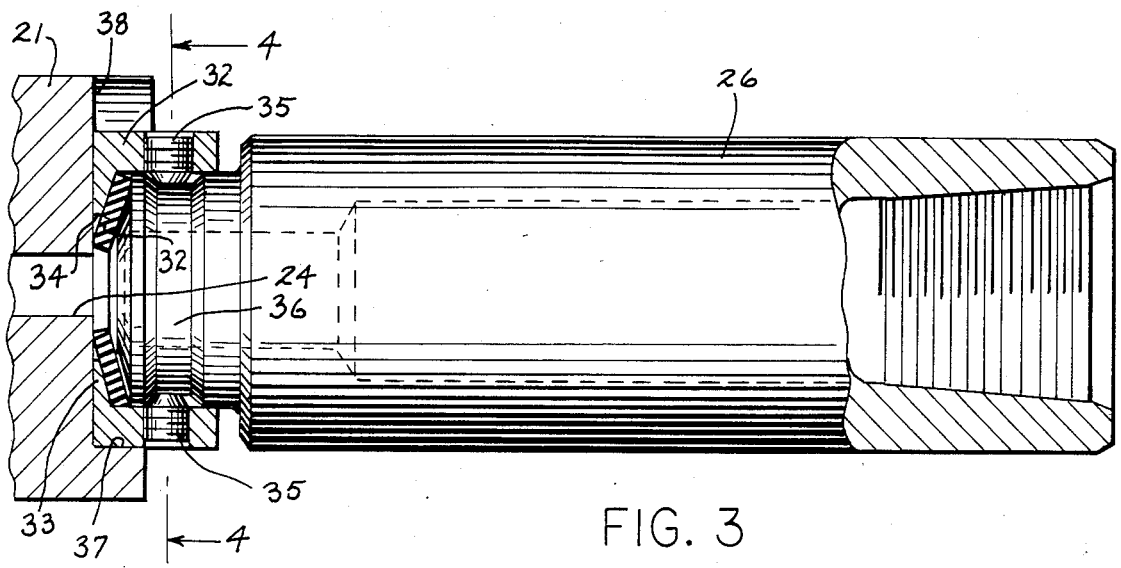
FIG. 3 is an enlarged detail view partially in section and shows the arrangement for engaging the coolant inducer ring on the cutting tool with the coolant inducer pipe.
Figure 4:
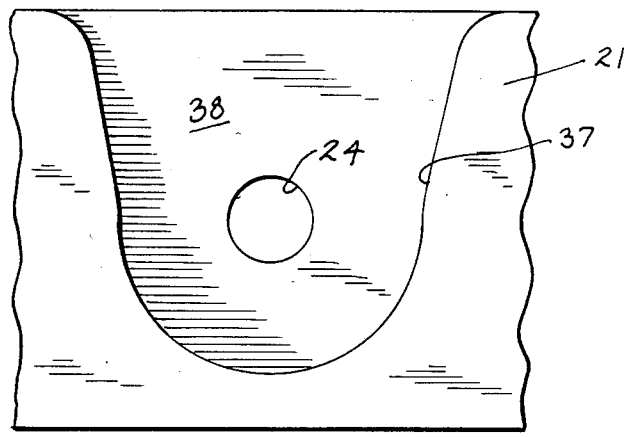
FIG. 4 is a detail view taken generally on the line 4—4 of FIG. 3.

For a proper and automatic operative engagement of the coolant inducer pipe 26, the coolant inducer ring 21 is provided with an upwardly opening U-shaped recess 37 that intercepts the radial inlet passage 24 in the ring. As generally shown in FIG. 4, the recess 37 is generally symmetrical relative to a vertical plane containing the axis of the passage 24 and the opposed sides of the recess taper upwardly and outwardly to provide a funnel-shaped entrance to the recess. The back wall 38 of the recess 37 is generally flat and extends generally normal to the axis of tubular passage 24 as perhaps best shown in FIG. 3.

In service, cutting tools 11 in the magazine 12 of the machine tool 10 will have their coolant inducer rings 21 generally oriented so that when the arm 15 picks up a selected cutting tool and brings it into position to engage within the spindle 13, the recess 37 of the inducer ring will likewise be in proper position for automatic engagement with the inducer pipe 26. Even if for any reason the inducer ring 21 is misoriented by a few degrees, the funnel-shaped entrance to the recess 37 will serve to properly adjust the ring on the cutting tool 11 and relative to the inducer pipe 26 to assure proper alignment between the inducer ring and the inducer pipe. When the cutting tool 11 is properly engaged within the spindle 13, the tubular passage 24 of the inducer ring 21 and the inducer pipe 26 will be properly aligned with the portion of washer 31 that projects beyond the cap member 32 on the end of the inducer pipe being sealingly depressed against the back wall 38 of the recess 37. With the inducer ring 21 and the inducer pipe 26 sealingly engaged and properly aligned, the coolant flow will be directed through the cutting tool 11 to cool the tool and workpiece and provide for efficient evacuation of the cutting chips.

Various modes of carrying out the invention are contemplated as being within the scope of the following claims particularly pointing out and distinctly claiming the subject matter which is regarded as the invention.

I claim:

1. In a machine tool having a head and a spindle drivingly supported by the head, a cutting tool comprising a generally cylindrical body and having a shank at one end thereof engageable within the machine tool spindle, a coolant inducer ring confined axially on the shank of the tool in spaced relation from the spindle engaging portion and having an inlet passage, said coolant inducer ring further having an upwardly opening U-shaped recess on the periphery thereof, said recess containing the inlet passage and being symmetrical relative to a vertical plane containing the axis of the passage and with the opposed recess walls tapering upwardly and outwardly to provide a funnel-shaped recess, said cutting tool body having flutes opening toward the leading end of the cutting tool and cutting edges associated with said flutes, said cutting tool body further having internal coolant passages with discharge openings adjacent to the cutting edges, said coolant passages communicating with said coolant inducer ring, a coolant inducer pipe having one end thereof communicating with a source of coolant, said inducer pipe being supported to place the opposite free open end thereof in fixed relation adjacent to and beneath the machine tool spindle, said free end of the coolant inducer pipe being engageable within the coolant inducer ring recess simultaneously with engagement of the shank of the cutting tool within the machine tool spindle, said recess serving to align the coolant inducer ring inlet passage with the coolant inducer pipe and thereby provide for coolant flow through and from the cutting tool to cool the cutting tool and workpiece in service.

2. The structure as set forth in claim 1 wherein the back wall of the recess is flat and extends generally normal to the axis of the inlet passage.

3. The structure as set forth in claim 2 wherein the open end of the inducer pipe has an annular sealing member engageable with the back wall of the recess and radially outward from the inlet passage of the inducer ring to substantially preclude coolant leakage at the connection between the inducer pipe and inducer ring.

* * * * *